(12) United States Patent
Hwang et al.

(10) Patent No.: US 11,954,847 B2
(45) Date of Patent: Apr. 9, 2024

(54) IMAGE IDENTIFICATION METHOD AND SYSTEM

(71) Applicant: TUL CORPORATION, New Taipei (TW)

(72) Inventors: Wen Jyi Hwang, New Taipei (TW); Chien Hua Chen, New Taipei (TW); Chien Wei Chen, New Taipei (TW)

(73) Assignee: TUL CORPORATION, New Taipei (TW)

( * ) Notice: Subject to any disclaimer, the term of this patent is extended or adjusted under 35 U.S.C. 154(b) by 520 days.

(21) Appl. No.: 17/355,264

(22) Filed: Jun. 23, 2021

(65) Prior Publication Data

US 2022/0005173 A1    Jan. 6, 2022

(30) Foreign Application Priority Data

Jul. 2, 2020   (TW) ................................ 109122446

(51) Int. Cl.
*G06T 7/00*   (2017.01)
*B25J 9/16*   (2006.01)
*G06N 3/08*   (2023.01)

(52) U.S. Cl.
CPC ............. *G06T 7/001* (2013.01); *B25J 9/1697* (2013.01); *G06N 3/08* (2013.01); *G06T 2207/20081* (2013.01); *G06T 2207/20084* (2013.01); *G06T 2207/30201* (2013.01)

(58) Field of Classification Search
CPC ........... G06T 7/001; G06T 2207/20081; G06T 2207/20084; G06T 2207/30201; G06T 5/00; G06T 2207/30168; G06T 7/00; B25J 9/1697; G06N 3/08; G06N 3/045; G06N 3/088; G06V 10/30; G06V 10/82; G06V 40/161; G06V 10/754
See application file for complete search history.

(56) References Cited

U.S. PATENT DOCUMENTS

| | | | |
|---|---|---|---|
| 2019/0272628 A1* | 9/2019 | Tsou ...................... | G06T 7/0004 |
| 2019/0294106 A1* | 9/2019 | Cheng .................. | G03H 1/0005 |
| 2019/0378260 A1* | 12/2019 | Brauer ..................... | G06T 7/001 |
| 2020/0005141 A1* | 1/2020 | Ambikapathi ......... | G06N 20/00 |
| 2020/0135511 A1* | 4/2020 | Lee ..................... | G01N 21/8422 |
| 2020/0234428 A1* | 7/2020 | George ............... | G06F 18/2413 |
| 2020/0311844 A1* | 10/2020 | Luo ....................... | G06V 40/172 |
| 2021/0232745 A1* | 7/2021 | Chou ..................... | G06N 3/045 |

* cited by examiner

*Primary Examiner* — Samir A Ahmed
(74) *Attorney, Agent, or Firm* — Lin & Associates Intellectual Property, Inc.

(57) ABSTRACT

An image identification method is provided, including: storing at least one normal state image of at least one test object; an automatic codec receiving the at least one normal state image to become a trained automatic codec; at least one camera device capturing at least one state image of the at least one test object; a computer device receiving the at least one state image, and the trained automatic codec performing feature extraction and reconstruction on the at least one state image to generate at least one reconstructed state image; and the computer device comparing the at least one state image and the at least one reconstructed state image, and determining whether the at least one state image is a normal state image. The present invention also provides an image identification system.

10 Claims, 11 Drawing Sheets when the computer device determining that the at least one state image being an abnormal state image, the computer device controlling a robotic arm to take the at least one electronic product to a defective product area —S20

FIG. 9

IMAGE IDENTIFICATION METHOD AND SYSTEM

CROSS-REFERENCE TO RELATED APPLICATION

This application claims the priority of Taiwanese patent application No. 109122446, filed on Jul. 2, 2020, which is incorporated herewith by reference.

BACKGROUND OF THE INVENTION

1. Field of the Invention

The present invention relates generally to an identification method and an identification system, in particular to an image identification method and an image identification system that performs a new identification method on images.

2. The Prior Arts

In the conventional technology, to capture defects in an image frame by image identification, or to determine whether the image frame is in a normal state, usually the acquired image frame is compared against a standard image (i.e., golden frame). As long as a difference exists between the two images, the acquired image is determined to be abnormal, and there may be defects or other abnormalities. However, there may be misjudgment in the aforementioned conventional technology, and the misjudgment situation will be explained as follows.

FIG. 10 is a schematic view for explaining a misjudgment situation of image frame comparison in one of the conventional technologies. Referring to FIG. 10, in the prior art, the image 901 acquired from the test object is compared with the standard image 903 of the test object to generate a result image 905. The image 901 includes a feature 92 of the image of the test object. The standard image 903 includes a standard feature 90 of the test object. From the result image 905, it can be seen that since the feature 92 has a displacement d' compared to the standard feature 90, the image 901 is determined as an abnormal state. However, in actual industrial applications, the displacement d' of the feature 92 does not affect the use of the object to be measure. The image 901 including the feature 92 can actually be regarded as a normal state image, and determining the image 901 as an abnormal state image will lead to a decline in the judgment yield.

FIG. 11 is a schematic view for explaining a misjudgment situation of image frame comparison in one of the conventional technologies. Referring to FIG. 11, similarly, in the prior art, the image 901 acquired from the test object is compared with the standard image 903 of the test object to generate a result image 905. The image 901 includes a feature 94 of the image of the test object. The standard image 903 includes a standard feature 90 of the test object. From the result image 905, it can be seen that since the feature 94 has a rotation value compared to the standard feature 90, the image 901 is determined as an abnormal state. However, in actual industrial applications, the rotation of the feature 94 does not affect the use of the object to be measure. The image 901 including the feature 94 can actually be regarded as a normal state image, and determining the image 901 as an abnormal state image will lead to a decline in the judgment yield.

On the other hand, in other conventional technologies, the currently known abnormal state image of the test object is stored in a database, and when the acquired image of the test object matches with the abnormal state images, the image of the test object can be judged as an abnormal state image. However, when the number of images of the test object increases over time, it is impossible to store all the produced abnormal images in the database, which is inhibitive to determine whether the images are normal or not. Therefore, for such identification methods, the abnormal state images need to be continuously updated in the database, which makes the operation tedious and ineffective.

SUMMARY OF THE INVENTION

It can be seen from the aforementioned prior art that the current image identification technologies will encounter many kinds of misjudgment situations or cumbersome in operation, resulting in many test objects that should be classified as in normal states are misjudged as abnormal, thereby reducing the correct ratio of image identification and waste the operation time.

Therefore, the objective of the present invention is to provide an image identification method and an image identification system with a new method for image identification, so as to improve the accuracy of image identification and reduce operation time.

An embodiment of the present invention provides an image identification method, comprising the following steps: storing at least one normal state image of at least one test object; an automatic codec receiving the at least one normal state image to become a trained automatic codec; at least one camera device capturing at least one state image of the at least one test object; a computer device receiving the at least one state image, and the trained automatic codec performing feature extraction and reconstruction on the at least one state image to generate at least one reconstructed state image; and the computer device comparing the at least one state image and the at least one reconstructed state image, and determining whether the at least one state image is a normal state image.

Preferably, the automatic codec and the trained automatic codec are both an asymmetric automatic codec, and the encoding part of the asymmetric automatic codec is a convolutional neural network comprising a plurality of convolutional layers and a plurality of max-pooling layers; the decoding part of the asymmetric automatic codec is a transposed convolutional neural network comprising a fully connected layer and a convolutional layer.

Preferably, the at least one reconstructed state image is an image generated by removing at least one defect in the at least one state image, and the computer device compares the at least one state image with the at least one reconstructed state image, and determines whether the at least one defect is included in the at least one status image.

Preferably, the at least one test object is at least one of an electronic product or a human face.

Furthermore, the image identification method of the present invention further comprises the following steps: when the computer device determines that the at least one state image is an abnormal state image, the computer device controls a robotic arm to take the at least one electronic product to a defective product area.

The present invention also provides an image identification system, comprising: a database storing at least one normal state image of at least one test object; at least one camera device capturing at least one state image of the at least one test object; and a computer device electrically connected to the database and the at least one camera device;

the computer device comprising an automatic codec for receiving the at least one normal state image to become a trained automatic codec, the computer device receiving the at least one state image, and the trained automatic codec performing feature extraction and reconstruction on the at least one state image to generate at least one reconstructed state image; wherein the computer device comparing the at least one state image and the at least one reconstructed state image, and determining whether the at least one state image being a normal state image.

Preferably, the automatic codec and the trained automatic codec are both an asymmetric automatic codec, and the encoding part of the asymmetric automatic codec is a convolutional neural network comprising a plurality of convolutional layers and a plurality of max-pooling layers; the decoding part of the asymmetric automatic codec is a transposed convolutional neural network comprising a fully connected layer and a convolutional layer.

Preferably, the at least one reconstructed state image is an image generated by removing at least one defect in the at least one state image, and the computer device compares the at least one state image with the at least one reconstructed state image, and determines whether the at least one defect is included in the at least one status image.

Preferably, the at least one test object is at least one of an electronic product or a human face.

Furthermore, the image identification system of the present invention further comprises a robotic arm electrically connected to the computer device, and when the computer device determines that the at least one state image is an abnormal state image, the computer device controls the robotic arm to take the at least one electronic product to a defective product area.

As seen, that the present invention provides a brand new image identification method and system. In the present invention, the automatic codec is trained by inputting the normal state image of the test object. As such, when performing image identification, even if the features of the test object has a slight displacement or rotation that does not affect the deviation value of the test object, the test object can be identified as in a normal state. Moreover, the present invention uses an automatic codec to perform feature extraction and reconstruction of the captured image, so that it can effectively determine whether the captured image matches the normal state image. Therefore, the present invention can effectively improve the accuracy of image identification and reduce the operation time.

BRIEF DESCRIPTION OF THE DRAWINGS

The present invention will be apparent to those skilled in the art by reading the following detailed description of a preferred embodiment thereof, with reference to the attached drawings, in which:

FIG. 9 is a flowchart of an image identification method according to another embodiment of the present invention.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

First Embodiment

Figure 1:
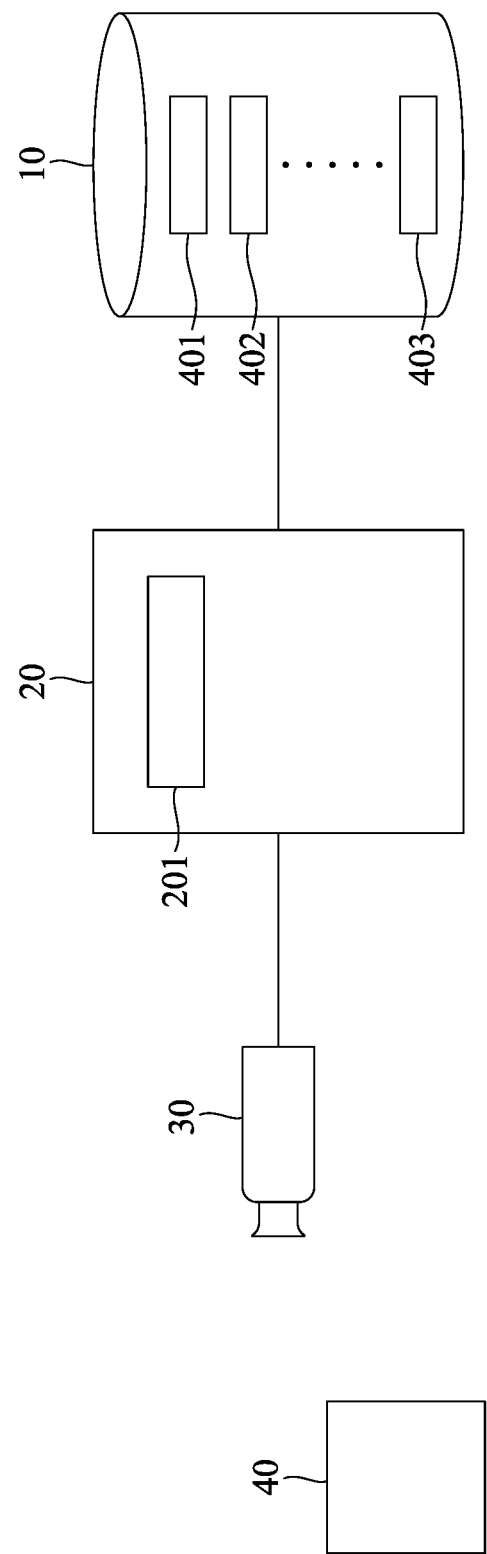
FIG. 1 is a schematic view of the architecture of an image identification system according to an embodiment of the present invention.

Referring to FIG. 1, FIG. 1 is a schematic view illustrating the architecture of an image identification system according to an embodiment of the present invention. In an embodiment of the present invention, the image identification system includes a database 10, a computer device 20 and at least one camera device 30. The database 10 stores at least one normal state image of at least one test object 40, such as normal state images 401-403; the camera device 30 captures at least one state image of the test object 40; the computer device 20 is electrically connected to the database 10 and the camera device 30. The computer device 20 includes an automatic codec 201, and the automatic codec 201 receives at least one normal state image, such as normal state images 401-403, to become a trained automatic codec. The computer device 20 receives the at least one state image of the test object 40 captured by the camera device 30, and the trained automatic codec performs feature extraction and reconstruction on the at least one state image to generate at least one reconstructed state image. The computer device 20 compares the at least one state image and the at least one reconstructed state image, and determines whether the at least one state image is a normal state image.

It is worth noting that in the training of the automatic codec 201, all normal state images of the test object 40 are stored in the database 10 and input to the automatic codec 201. Compared with the conventional technology using the currently known abnormal state images, the present invention does not need to update the database 10 frequently in response to newly added abnormal state images, and can greatly reduce the number of encounters that are not stored in the database 10 during the identification process. As such, the operating efficiency of the image identification system can be greatly increased.

In addition, in an embodiment of the present invention, the number of camera devices 30 may be more than one to capture state images of the test object 40 from different angles for image identification.

Figure 2:
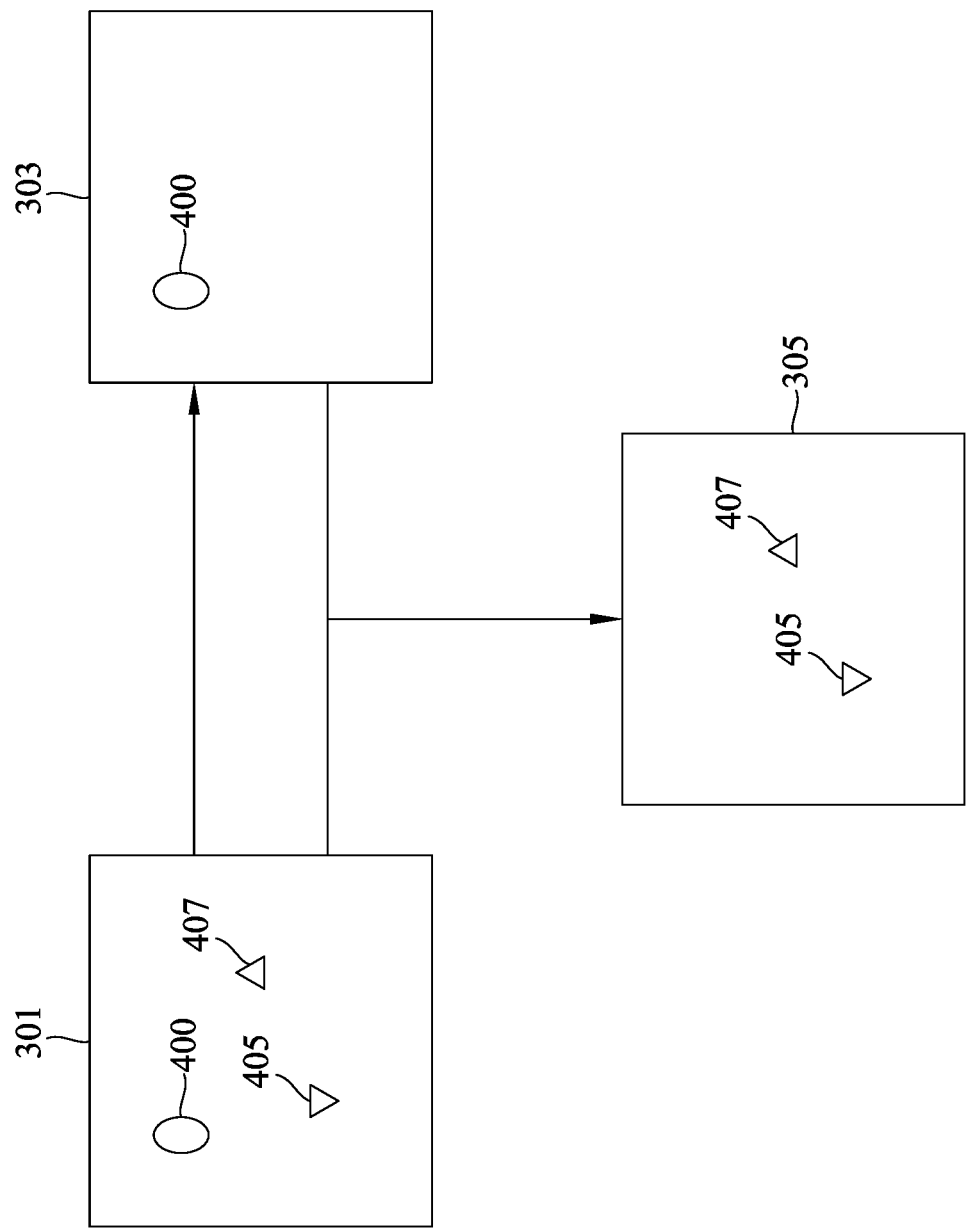
FIG. 2 is a schematic view of image comparison of an image identification system according to an embodiment of the present invention.

FIG. 2 is a schematic view illustrating the image comparison of the image identification system according to an embodiment of the present invention. Referring FIGS. 1 and 2, in an embodiment of the present invention, the computer device 20 receives at least one state image 301 captured by the camera device 30 from the test object 40, and the trained automatic codec performs feature extraction and reconstruction on the at least one state image 301 to generate at least one reconstructed state image 303. Wherein, the state image 301 includes a feature 400, a defect 405, and a defect 407. When the trained automatic codec receives the state image 301, the trained automatic codec will compare whether the feature 400 in the state image 301 matches the images in the normal state, and only the features 400 matching the images in the normal state are extracted and reconstructed into the reconstructed state image 303.

Finally, the computer device 20 compares the state image 301 with the reconstructed state image 303 and generates a result image 305 to determine whether the state image 301 is a normal state image. Specifically, in FIG. 2, when the state image 301 is compared with the reconstructed state image 303, the normal state feature 400 will be removed from the result image 305 and the defect 405 and defect 407 will remain. Therefore, the computer device 20 determines that the state image 301 is an abnormal state image because it contains defects 405 and 407.

Second Embodiment

Figure 3:
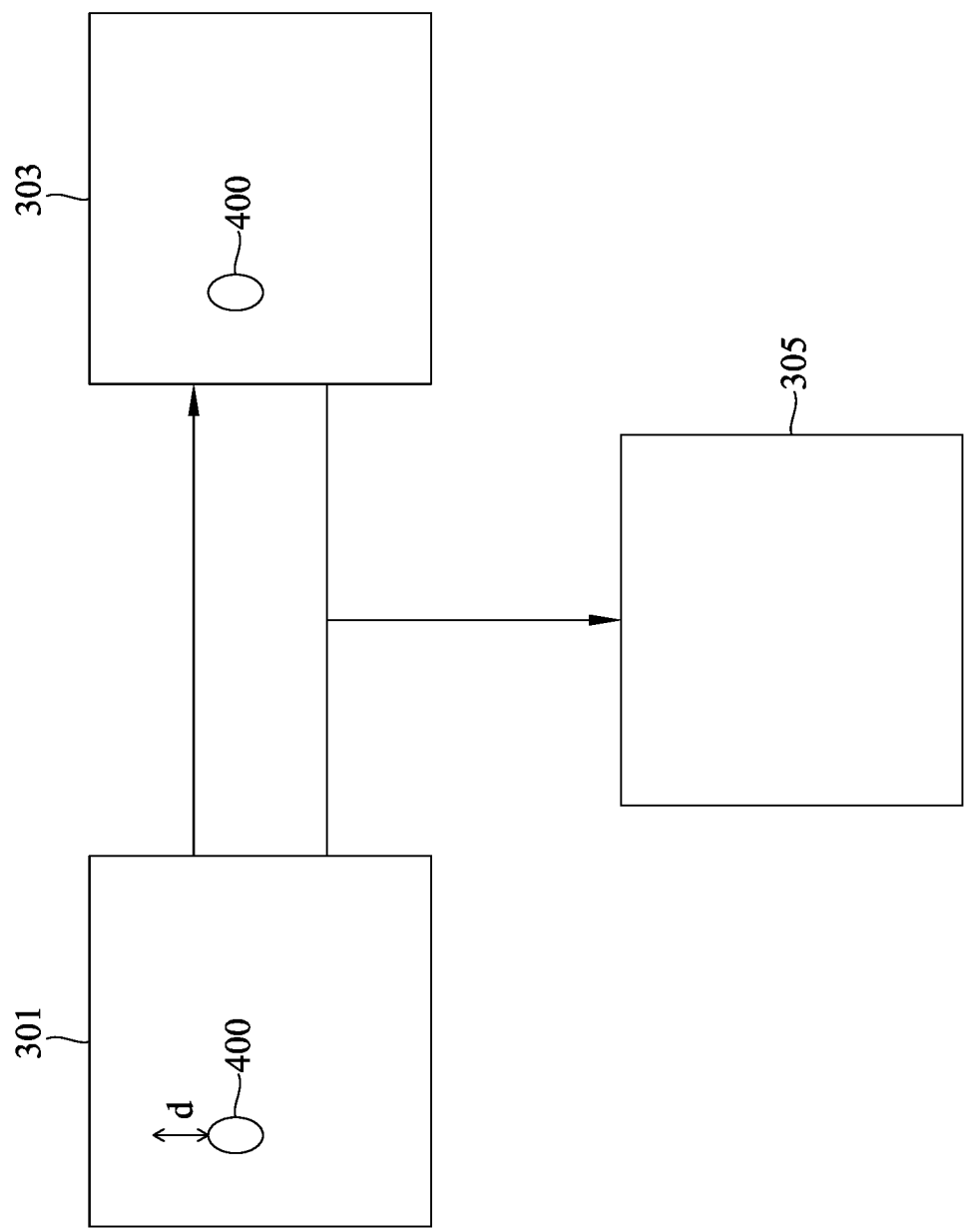
FIG. 3 is a schematic view of image comparison of an image identification system according to another embodiment of the present invention.

FIG. 3 is a schematic view illustrating the image comparison of the image identification system according to another embodiment of the present invention. Referring to FIGS. 1 and 3, in another embodiment of the present invention, similarly, the state image 301 includes a feature 400, and the feature 400 has a displacement d compared with the normal position, but it should be understood that the state image 301 has a displacement d of the feature 400 does not affect the test object 40, so the state image 301 can be regarded as in a normal state. Furthermore, after the trained automatic codec receives the state image 301, the trained automatic codec will compare whether the feature 400 in the state image 301 matches the normal state image, and will only extract and reconstruct the feature 400 into the reconstructed state image 303.

Wherein, because the trained automatic codec has received information that the feature 400 with displacement d can be regarded as a normal state image during the training process, the reconstructed state image 303 will include the feature 400. Finally, the computer device 20 compares the state image 301 with the reconstructed state image 303 and generates a result image 305, and the result image 305 does not contain other features, so the state image 301 is determined to be a normal state image.

Third Embodiment

Figure 4:
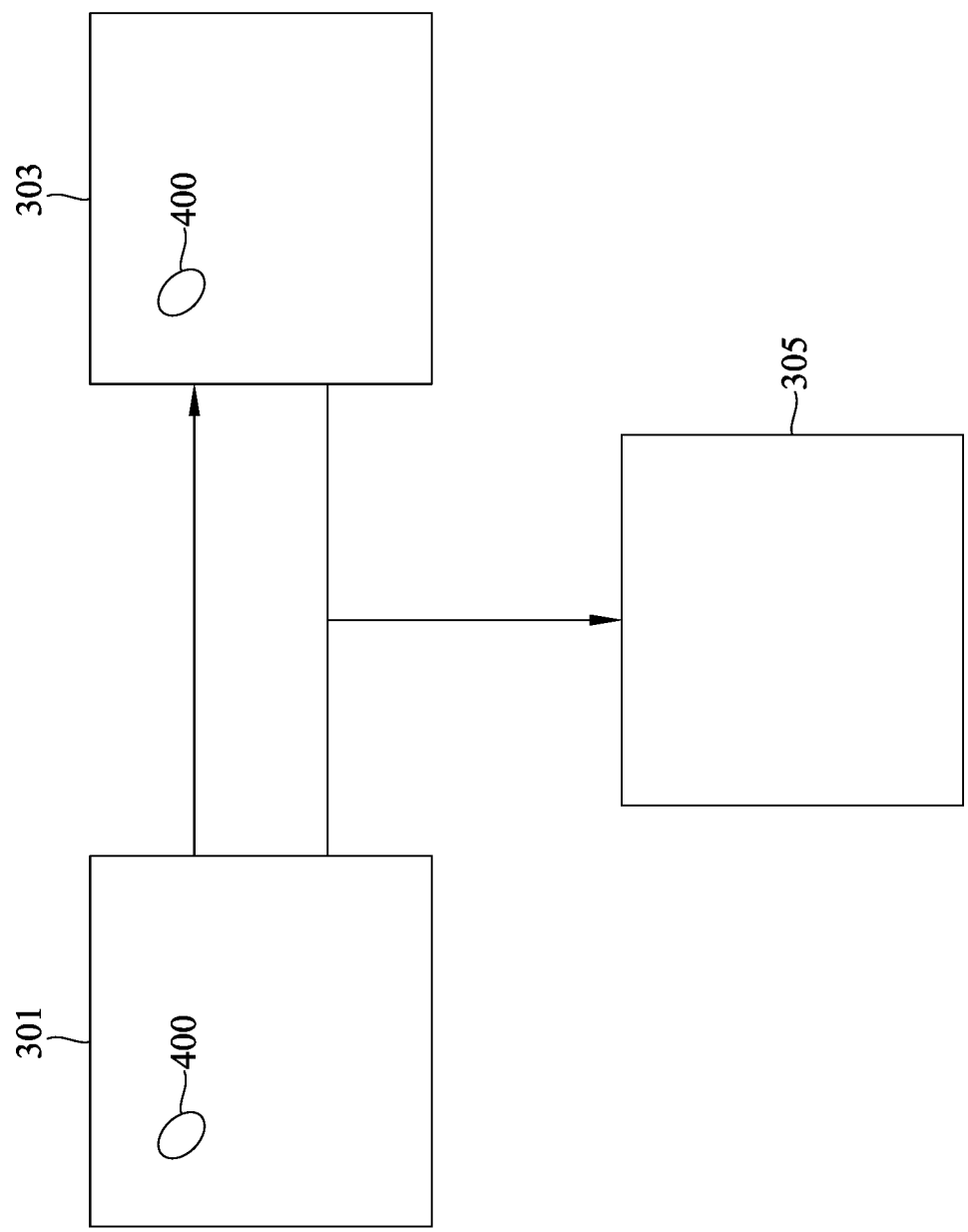
FIG. 4 is a schematic view of image comparison of an image identification system according to yet another embodiment of the present invention.

FIG. 4 is a schematic view for the image comparison of the image identification system according to yet another embodiment of the present invention. Referring to FIGS. 1 and 4, in yet another embodiment of the present invention, similarly, the state image 301 includes a feature 400, and the feature 400 has a rotation value compared with the normal position, but it should be understood that the rotated feature 400 does not affect the test object 40, and therefore can be regarded as a normal state image. Furthermore, after the trained automatic codec receives the state image 301, the trained automatic codec will compare whether the feature 400 in the state image 301 matches the normal state image, and only the feature 400 is extracted and reconstructed into the reconstructed state image 303.

Wherein, because the trained automatic codec has received information that the feature 400 with the rotation value can be a normal state image during the training process, the reconstructed state image 303 will include the feature 400. Finally, the computer device 20 compares the state image 301 with the reconstructed state image 303 and generates a result image 305, and the result image 305 does not contain other features, so the state image 301 is determined to be a normal state image.

Figure 5:
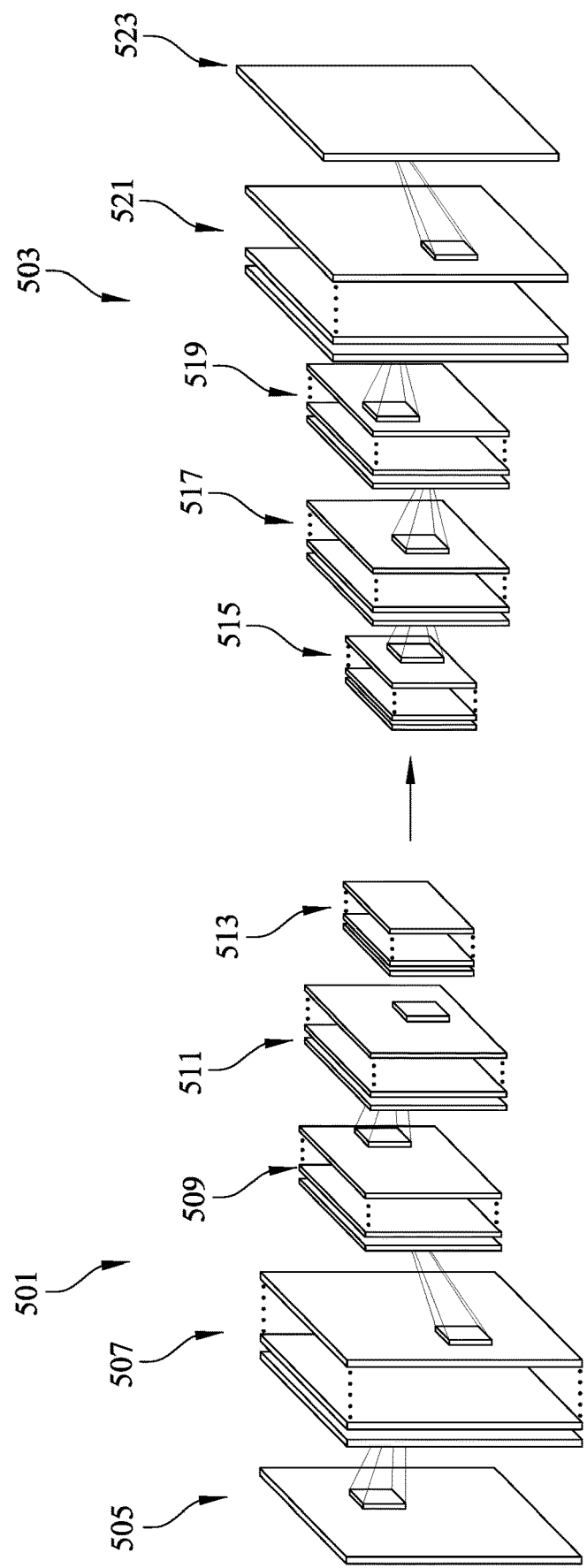
FIG. 5 is a schematic view of the image codec architecture of the conventional technology.

FIG. 5 is a schematic view illustrating the architecture of image codec in the prior art. In the prior art, the image codec is usually a symmetrical codec. For example, when the image 505 is input to the encoding part 501 of the symmetrical codec, the image 505 usually passes through a convolutional layer 507, a max-pooling layer 509, a convolutional layer 511, and a max-pooling layer 513 to extract the features of the image 505. Then, the features will enter the decoding part of the symmetrical codec 503, and pass through a convolutional layer 515, an up-sampling layer 517, a convolutional layer 519, and an up-sampling layer 521 to generate a decoded image 523.

However, in the aforementioned conventional codec technology, the coding and decoding process will be too cumbersome, resulting in longer processing time, and the image may be distorted due to the cumbersome coding and decoding process.

Figure 6:
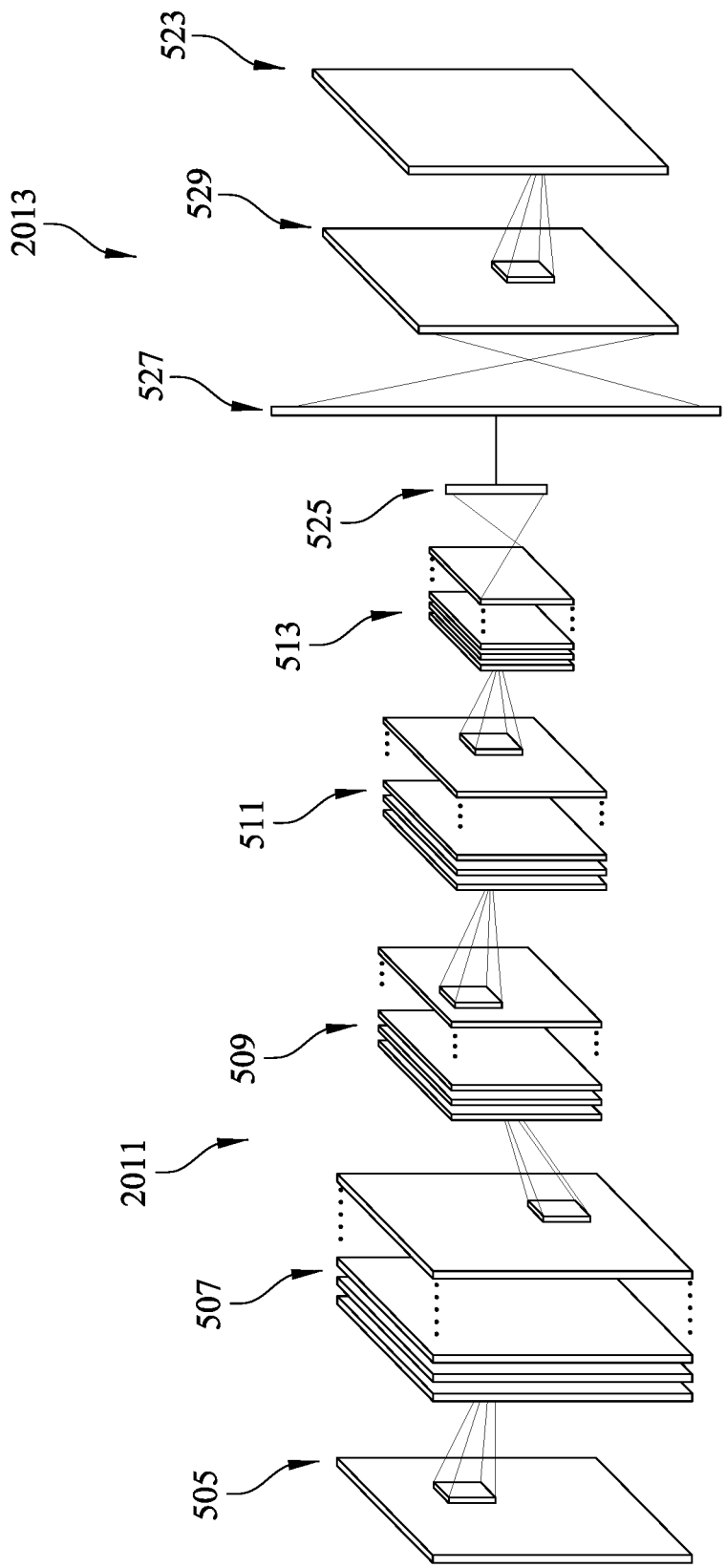
FIG. 6 is a schematic view of an image codec architecture according to an embodiment of the present invention.

FIG. 6 is a schematic view illustrating the image codec architecture of an embodiment of the present invention. Referring to FIGS. 1 and 6, the automatic codec 201 and the trained automatic codec are both an asymmetric automatic codec, and the encoding part of the asymmetric automatic codec is a convolutional neural network comprising a plurality of convolutional layers and a plurality of max-pooling layers; the decoding part of the asymmetric automatic codec is a transposed convolutional neural network comprising a fully connected layer and a convolutional layer.

For example, when the image 505 is input to the encoding part 2011 of the asymmetric codec, it will pass through a convolution layer 507, a max-pooling layer 509, a convolution layer 511, and a max-pooling layer. 513, to extract the feature 525 of the image 505. Then, the feature 525 will enter the decoding part 2013 of the asymmetric codec, and go through the fully connected layer 527 and the convolutional layer 529 to generate the decoded image 523.

It is worth noting that the use of an asymmetric codec in the present invention has the following advantages: a fully connected layer for global reconstruction is included in the decoding part, and the fully connected layer and the convolutional layer are connected so as to use the convolutional layer to optimize the information, which not only ensures the accuracy of the image reconstruction, but also reduces the processing time of the codec.

Figure 7:
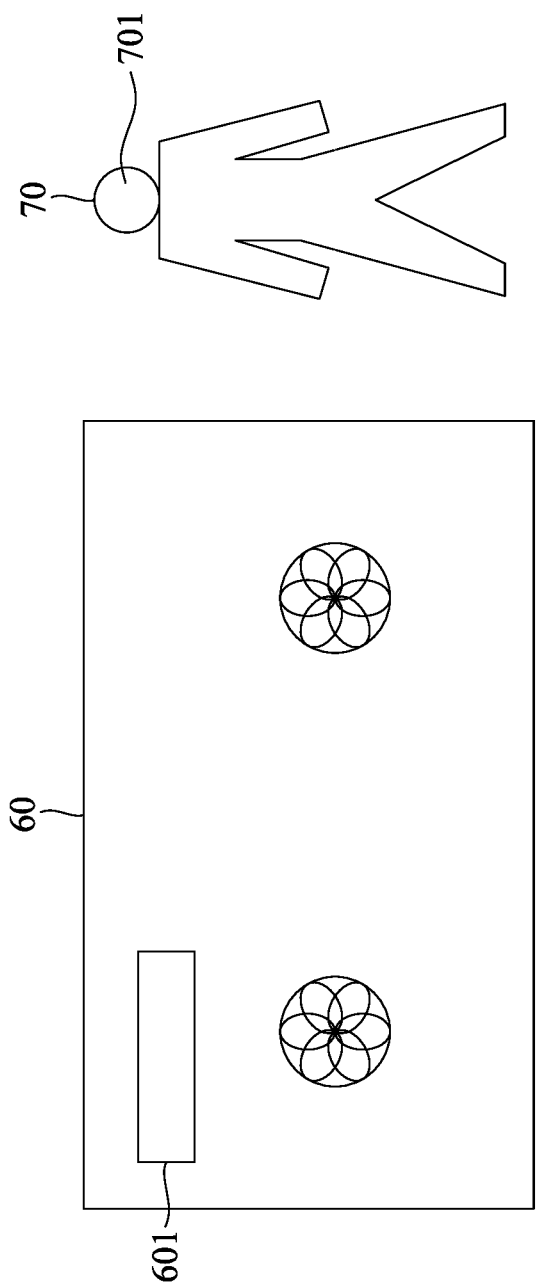
FIG. 7 is a schematic view of an test object according to an embodiment of the present invention.

FIG. 7 is a schematic view illustrating a test object according to an embodiment of the present invention. Referring to FIGS. 1 and 7, the at least one test object 40 may be one of the at least one electronic product or human face. Specifically, the electronic product is, for example, a PCB, a display card, a motherboard, and so on. Taking the display card 60 as an example, the display card 60 includes a feature 601 and a plurality of fans. The present invention can determine whether the feature 601 is normal or the display card 60 includes any defects, whether the fan is in a normal state, such as, any scratches. Wherein, the feature 601 is, for example, a product certification sticker or a product LOGO, and the product certification sticker or product LOGO is slightly displaced or rotated during identification. It can be identified as in a normal state. In addition, the present invention can also be used to automatically identify whether the solder joints on the PCB include scratches, clear prints, or false soldering, or automatically identify whether the motherboard includes any defects. Therefore, the present invention can be applied to automatic production lines in the electronics industry.

Furthermore, the test object 40 can be a human face 70 to automatically identify whether the features 701 on the human face conform to the normal state by the present invention, and the human face can be identified as normal if it is slightly skewed during identification. Therefore, the present invention can also be applied to the access control management industry.

Fourth Embodiment

Refer to FIG. 1. In other embodiments of the present invention, when the test object 40 is an electronic product, the image identification system may further include a robotic arm (not shown), which is electrically connected to the computer device 20. When the computer device 20 determines that the captured state image of the test object 40 is an abnormal state image, the computer device 20 controls the robotic arm to take the at least one electronic product to a defective product area, in order to achieve the purpose of production line automation.

Fifth Embodiment

Figure 8:
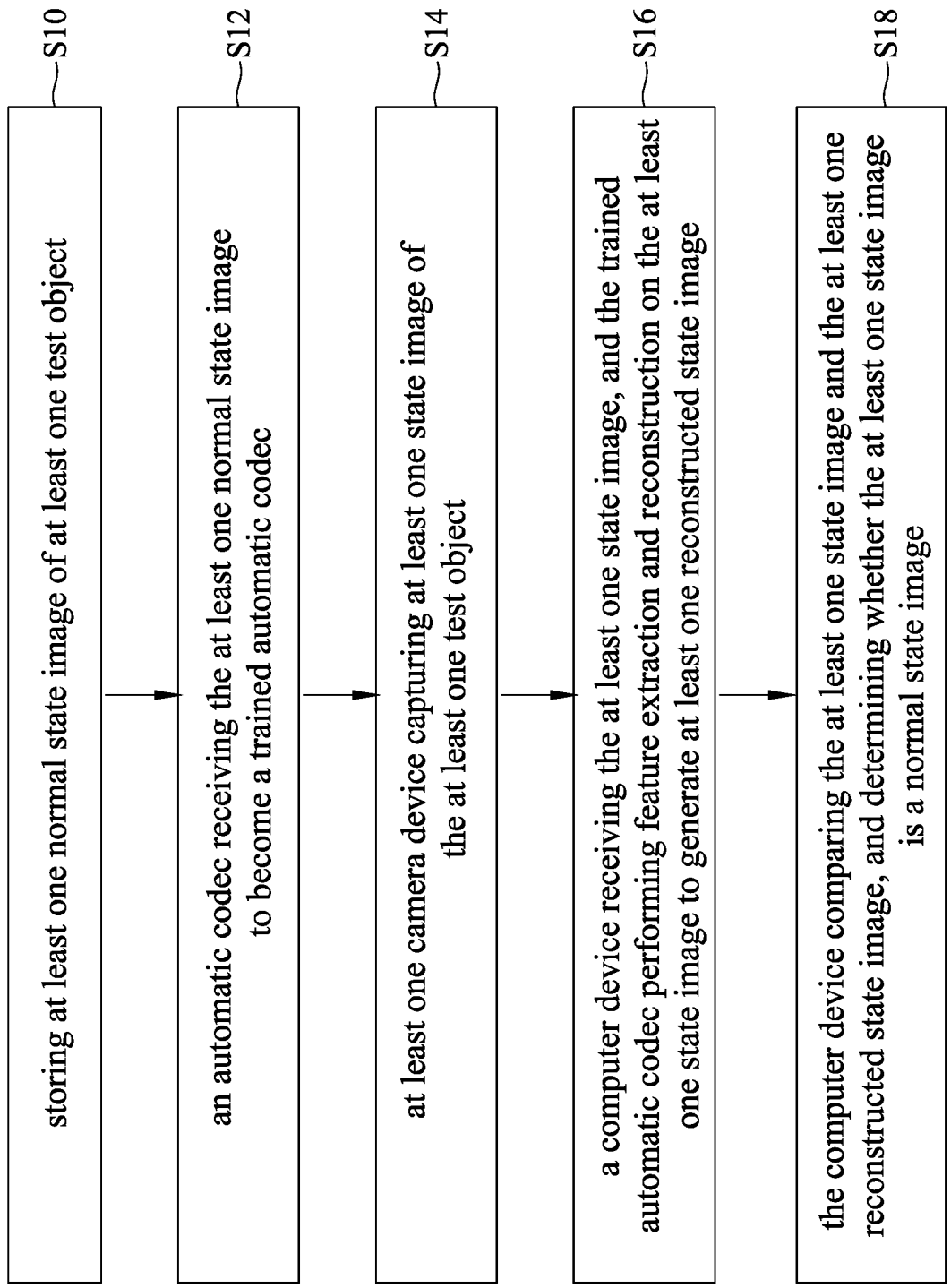
FIG. 8 is a flowchart of an image identification method according to an embodiment of the present invention.
Figure 10:
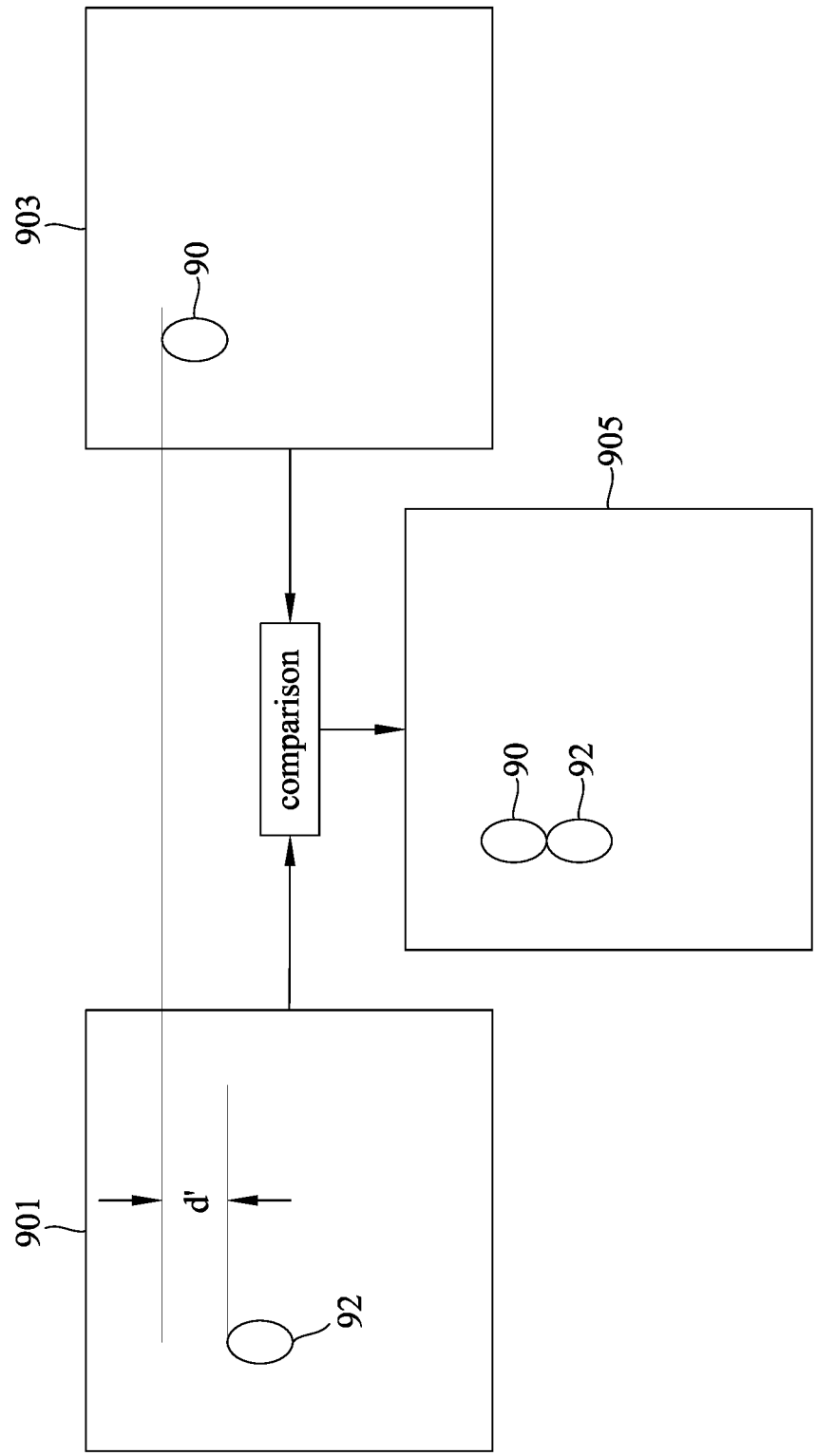
FIG. 10 is a schematic view of a misjudgment situation of an image frame comparison in one of the conventional technologies.
Figure 11:
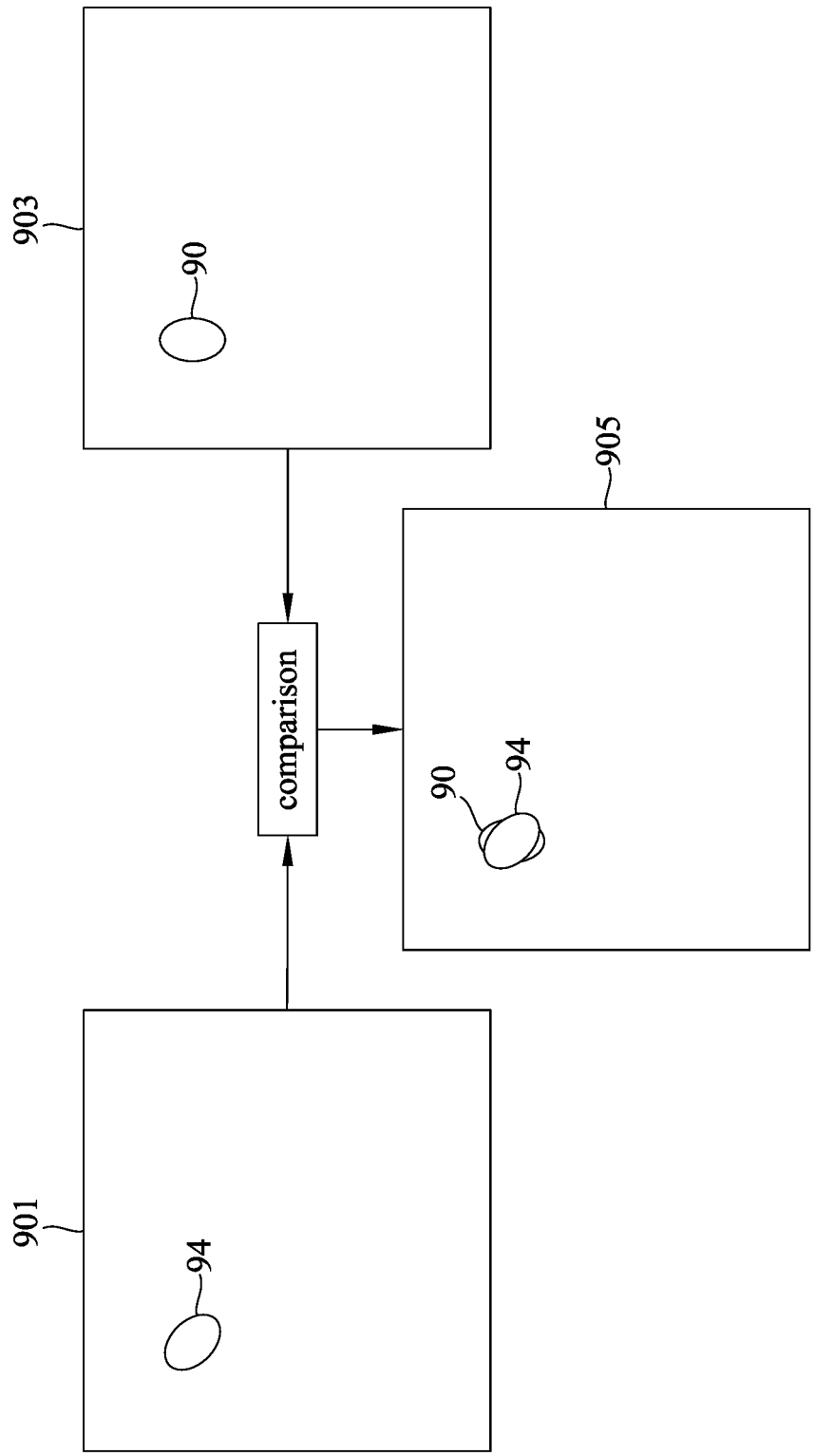
FIG. 11 is a schematic view of a misjudgment situation of image frame comparison in one of the conventional technologies.

Furthermore, the present invention also provides an image identification method. FIG. 8 is a flowchart for an image identification method according to an embodiment of the present invention. Referring to FIGS. 1-6 and FIG. 8, an image identification method of an embodiment of the present invention includes steps S10-S18, wherein step S10 is: storing at least one normal state image of at least one test object 40, for example, storing the normal state images 401-403 in a database 10; step S12 is: an automatic codec 201 receiving the at least one normal state image to become a trained automatic codec; step S14 is: at least one camera device 30 capturing at least one state image 301 of the at least one test object 40; step S16 is: a computer device 20 receiving the at least one state image 301, and the trained automatic codec performing feature extraction and reconstruction on the at least one state image 301 to generate at least one reconstructed state image 303; and step S18 is: the computer device 20 comparing the at least one state image 301 and the at least one reconstructed state image 303, and determining whether the at least one state image 301 is a normal state image. Wherein, the at least one test object 40 can be one of at least one electronic product or human face.

Similarly, in an embodiment of the image identification method of the present invention, the computer device 20 compares the state image 301 with the reconstructed state image 303 and generates a result image 305 to determine whether the state image 301 is a normal state image. Specifically, in FIG. 2, when the state image 301 is compared with the reconstructed state image 303, the normal state feature 400 will be removed from the result image 305 and the defect 405 and defect 407 will remain. Therefore, the computer device 20 determines that the state image 301 is an abnormal state image because it contains defects 405 and 407.

Furthermore, in an embodiment of the image identification method of the present invention, the automatic codec 201 and the trained automatic codec are both an asymmetric automatic codec, and the encoding part of the asymmetric automatic codec is a convolutional neural network including a plurality of convolutional layers and a plurality of max-pooling layers. The decoding part of the asymmetric automatic codec is a transposed convolutional neural network including a fully connected layer and a convolutional layer. For example, when the image 505 is input to the encoding part 2011 of the asymmetric codec, the image 505 will pass through a convolution layer 507, a max-pooling layer 509, a convolution layer 511, and a max-pooling layer. 513, to extract the feature 525 of the image 505. Then, the feature 525 will enter the decoding part 2013 of the asymmetric codec, and go through the fully connected layer 527 and the convolutional layer 529 to generate the decoded image 523.

Sixth Embodiment

FIG. 9 is a flowchart for explaining an image identification method according to another embodiment of the present invention. Referring to FIGS. 1-4 and FIG. 9, when the at least one object 40 is at least one electronic product, the image identification method further includes step S20, and step S20 is: when the computer device 20 determining that the at least one state image 301 is an abnormal state image, the computer device 20 controlling a robotic arm to take the at least one electronic product to a defective product area.

In summary, the present invention provides a brand new image identification method and system. In the present invention, the automatic codec is trained by inputting the normal state image of the test object. As such, when performing image identification, even if the features of the test object has a slight displacement or rotation that does not affect the deviation value of the test object, the test object can be identified as in a normal state. Therefore, the present invention can be applied to industries that require image identification, such as identification of electronic products in the electronics industry, or face identification in the access control industry, and the like.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An image identification method, comprising the following steps:
storing at least one normal state image of at least one test object;
an automatic codec receiving the at least one normal state image to become a trained automatic codec;
at least one camera device capturing at least one state image of the at least one test object;
a computer device receiving the at least one state image, and the trained automatic codec performing feature extraction and reconstruction on the at least one state image to generate at least one reconstructed state image; and
the computer device comparing the at least one state image and the at least one reconstructed state image, and determining whether the at least one state image is a normal state image.

2. The image identification method according to claim 1, wherein the automatic codec and the trained automatic codec are both an asymmetric automatic codec, and the encoding part of the asymmetric automatic codec is a convolutional neural network comprising a plurality of convolutional layers and a plurality of max-pooling layers; the decoding part of the asymmetric automatic codec is a transposed convolutional neural network comprising a fully connected layer and a convolutional layer.

3. The image identification method according to claim 1, wherein the at least one reconstructed state image is an image generated by removing at least one defect in the at least one state image, and the computer device compares the at least one state image with the at least one reconstructed state image, and determines whether the at least one defect is included in the at least one status image.

4. The image identification method according to claim 1, wherein the at least one test object is at least one of an electronic product or a human face.

5. The image identification method according to claim 4, further comprising the following steps: when the computer device determining that the at least one state image being an abnormal state image, the computer device controlling a robotic arm to take the at least one electronic product to a defective product area.

6. An image identification system, comprising:
a database storing at least one normal state image of at least one test object;
at least one camera device, for capturing at least one state image of the at least one test object; and
a computer device electrically connected to the database and the at least one camera device; the computer device comprising an automatic codec for receiving the at least one normal state image to become a trained automatic codec, the computer device receiving the at least one state image, and the trained automatic codec performing feature extraction and reconstruction on the at least one state image to generate at least one reconstructed state image;
wherein the computer device comparing the at least one state image and the at least one reconstructed state image, and determining whether the at least one state image being a normal state image.

7. The image identification system according to claim 6, wherein the automatic codec and the trained automatic codec are both an asymmetric automatic codec, and the encoding part of the asymmetric automatic codec is a convolutional neural network comprising a plurality of convolutional layers and a plurality of max-pooling layers; the decoding part of the asymmetric automatic codec is a transposed convolutional neural network comprising a fully connected layer and a convolutional layer.

8. The image identification system according to claim 6, wherein the at least one reconstructed state image is an image generated by removing at least one defect in the at least one state image, and the computer device compares the at least one state image with the at least one reconstructed state image, and determines whether the at least one defect is included in the at least one status image.

9. The image identification system according to claim 6, wherein the at least one test object is at least one of an electronic product or a human face.

10. The image identification system according to claim 9, further comprising a robotic arm, electrically connected to the computer device; when the computer device determining that the at least one state image being an abnormal state image, the computer device controlling the robotic arm to take the at least one electronic product to a defective product area.

\* \* \* \* \*